(12) United States Patent
Wu et al.

(10) Patent No.: US 11,100,306 B1
(45) Date of Patent: Aug. 24, 2021

(54) DISPLAY PANEL AND DISPLAY DEVICE

(71) Applicant: Xiamen Tianma Micro-Electronics Co., Ltd., Xiamen (CN)

(72) Inventors: Xiaoxiao Wu, Xiamen (CN); Jiaqian Wu, Xiamen (CN); Min Huang, Xiamen (CN); Guozhao Chen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 16/996,258

(22) Filed: Aug. 18, 2020

(30) Foreign Application Priority Data

Jun. 30, 2020 (CN) .......................... 202010621174.5

(51) Int. Cl.
*G06K 9/00* (2006.01)
*G09G 3/20* (2006.01)
*G09G 3/3266* (2016.01)

(52) U.S. Cl.
CPC ......... *G06K 9/0002* (2013.01); *G09G 3/2092* (2013.01); *G09G 3/3266* (2013.01)

(58) Field of Classification Search
CPC ... G09G 3/2092; G09G 3/3266; G06K 9/0002
See application file for complete search history.

(56) References Cited

U.S. PATENT DOCUMENTS

| 2013/0009938 | A1* | 1/2013 | Hwang | G09G 3/3644 345/212 |
|---|---|---|---|---|
| 2014/0132556 | A1* | 5/2014 | Huang | G06F 3/04182 345/174 |
| 2017/0330503 | A1* | 11/2017 | Yang | H01L 27/326 |
| 2020/0210065 | A1* | 7/2020 | Chen | G06K 9/2081 |
| 2021/0133416 | A1* | 5/2021 | Kim | G06F 3/0412 |
| 2021/0167135 | A1* | 6/2021 | Park | G06K 9/0002 |

FOREIGN PATENT DOCUMENTS

| CN | 1503274 A | 7/1924 |
|---|---|---|
| CN | 108039126 A | 5/2018 |

\* cited by examiner

*Primary Examiner* — Premal R Patel
(74) *Attorney, Agent, or Firm* — Anova Law Group, PLLC

(57) ABSTRACT

A display panel and a display device are provided in the present disclosure. The display panel includes a display region and a non-display region surrounding the display region. The display region includes a plurality of fingerprint recognition units. The non-display region includes a drive chip and Q first gate drive circuits, where the drive chip includes a first encoding circuit including M signal output terminals. The non-display region further includes a first decoding circuit and M first signal lines. The first decoding circuit includes M signal input terminals and N signal output terminals, where $1 \leq M < Q \leq N$, and M, Q, N are positive integers. A signal output terminal of the first encoding circuit is electrically connected to a corresponding signal input terminal of the first decoding circuit through one first signal line; and each first gate drive circuit is connected to one signal output terminal of the first decoding circuit correspondingly.

20 Claims, 12 Drawing Sheets

DISPLAY PANEL AND DISPLAY DEVICE

CROSS-REFERENCE TO RELATED APPLICATION

This application claims the priority of Chinese Patent Application No. 202010621174.5, filed on Jun. 30, 2020, the content of which is incorporated herein by reference in its entirety.

TECHNICAL FIELD

The present disclosure generally relates to the field of display technology and, more particularly, relates to a display panel and a display device.

BACKGROUND

In recent years, a variety of display devices with fingerprint recognition functions, such as mobile phones, tablet computers, smart wearable devices and the like, have been emerged. Before operating a display device with the fingerprint recognition function, a user only needs to touch the display device with a finger to perform authorization verification, which may simplify the authorization verification process. Moreover, as application scenarios of the fingerprint recognition function gradually increase, the fingerprint recognition region has gradually evolved from partial region recognition to full-screen recognition.

In order to implement the full-screen fingerprint recognition function, it is necessary to partition the fingerprint recognition units in the display device. The fingerprint recognition units in all regions are driven by different drive circuits, and at least one signal line is disposed between each drive circuit and a drive chip. Therefore, it is difficult for a corresponding display device to achieve narrow frame design.

SUMMARY

One aspect of the present disclosure provides a display panel. The display panel includes a display region and a non-display region surrounding the display region. The display region includes a plurality of fingerprint recognition units arranged in an array along a first direction and a second direction, where the first direction intersects the second direction. The non-display region includes a drive chip and Q first gate drive circuits arranged along the second direction. The drive chip is on a side of the display region and arranged along the second direction with the display region; a first gate drive circuit is electrically connected to at least two rows of fingerprint recognition units extending along the first direction; and the drive chip includes a first encoding circuit including M signal output terminals. The non-display region further includes a first decoding circuit and M first signal lines. The first decoding circuit includes M signal input terminals and N signal output terminals, where $1 \leq M < Q \leq N$, and M, Q, N are all positive integers. The signal output terminals of the first encoding circuit and the signal input terminals of the first decoding circuit have a one-to-one correspondence; and a signal output terminal of the first encoding circuit is electrically connected to a corresponding signal input terminal of the first decoding circuit through one first signal line. Each first gate drive circuit is connected to one signal output terminal of the first decoding circuit correspondingly.

Another aspect of the present disclosure provides a display device including a display panel. The display panel includes a display region and a non-display region surrounding the display region. The display region includes a plurality of fingerprint recognition units arranged in an array along a first direction and a second direction, where the first direction intersects the second direction. The non-display region includes a drive chip and Q first gate drive circuits arranged along the second direction. The drive chip is on a side of the display region and arranged along the second direction with the display region; a first gate drive circuit is electrically connected to at least two rows of fingerprint recognition units extending along the first direction; and the drive chip includes a first encoding circuit including M signal output terminals. The non-display region further includes a first decoding circuit and M first signal lines. The first decoding circuit includes M signal input terminals and N signal output terminals, where $1 \leq M < Q \leq N$, and M, Q, N are all positive integers. The signal output terminals of the first encoding circuit and the signal input terminals of the first decoding circuit have a one-to-one correspondence; and a signal output terminal of the first encoding circuit is electrically connected to a corresponding signal input terminal of the first decoding circuit through one first signal line. Each first gate drive circuit is connected to one signal output terminal of the first decoding circuit correspondingly.

Other aspects of the present disclosure can be understood by those skilled in the art in light of the description, the claims, and the drawings of the present disclosure.

BRIEF DESCRIPTION OF THE DRAWINGS

Drawings incorporated in the specification and forming a part of the specification demonstrate the embodiments of the present disclosure and, together with the specification, describe the principles of the present disclosure.

DETAILED DESCRIPTION

Figure 1:
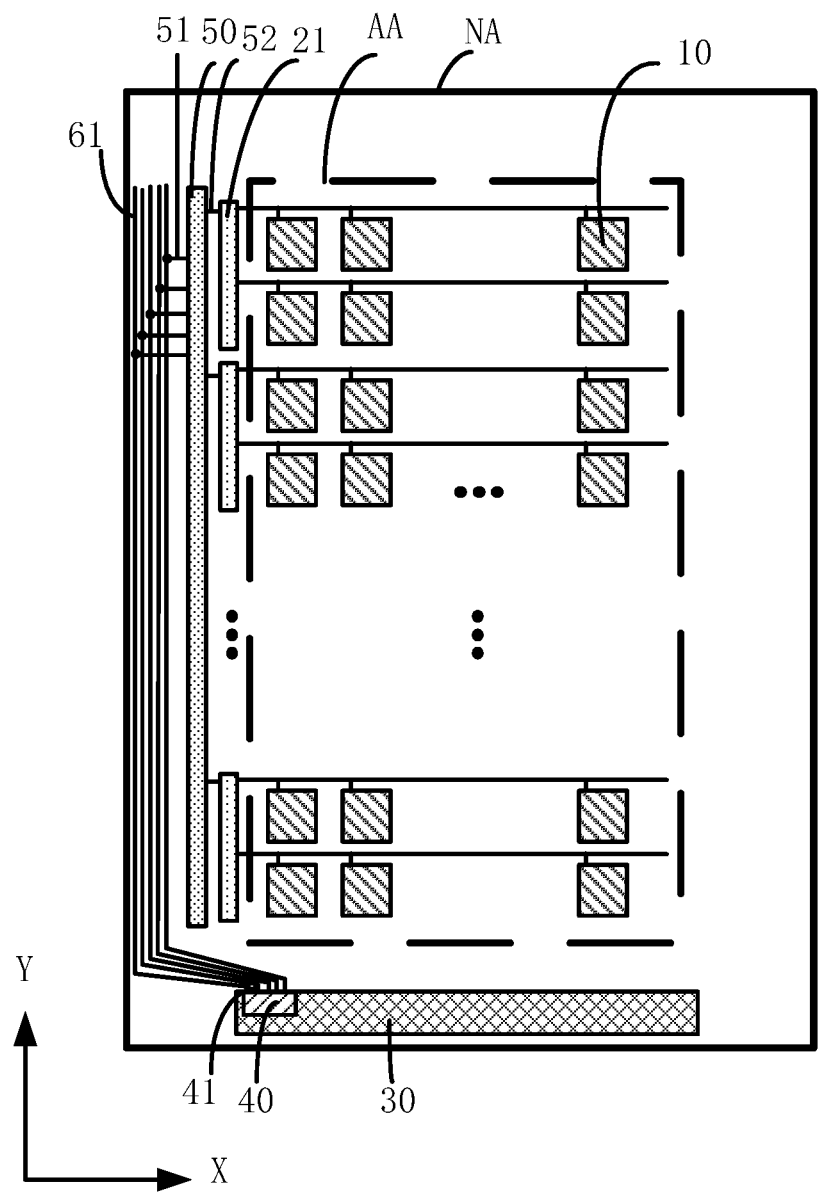
FIG. 1 illustrates a planar structural schematic of an exemplary display panel according to various embodiments of the present disclosure.

Various embodiments of the present disclosure are described in detail with reference to the drawings. It should be noted that the relative arrangement of components and steps, numerical expressions, and numerical values set forth in the embodiments may not limit the scope of the present disclosure unless specifically stated otherwise.

The following description of at least one exemplary embodiment is merely illustrative, which may not limit the present disclosure and its application or use.

Techniques, methods and equipment known to those skilled in the art may not be discussed in detail, but where appropriate, the techniques, methods and equipment should be considered as a part of the specification.

In all exemplary embodiments shown and discussed herein, any specific values should be interpreted as merely exemplary and not limiting. Therefore, other examples of the exemplary embodiments may have different values.

It should be noted that similar reference numerals and letters indicate similar items in the following drawings. Therefore, once an item is defined in one drawing, there is no need to discuss it further in subsequent drawings.

FIG. 1 illustrates a planar structural schematic of a display panel according to various embodiments of the present disclosure. Referring to FIG. 1, the display panel is provided in one embodiment and includes a display region AA and a non-display region NA surrounding the display region AA.

The display region AA may include a plurality of fingerprint recognition units 10 arranged in an array along a first direction X and a second direction Y, where the first direction X intersects the second direction Y.

The non-display region NA may include Q first gate drive circuits 21 arranged along the second direction Y and a drive chip 30. The drive chip 30 may be on a side of the display region AA and arranged along the second direction Y with the display region.

A first gate drive circuit 21 may be electrically connected to at least two rows of fingerprint recognition units 10 extending along the first direction X.

The drive chip 30 may include a first encoding circuit 40, and the first encoding circuit 40 may include M signal output terminals 41.

The non-display region NA may further include a first decoding circuit 50 and M first signal lines 61. The first decoding circuit 50 may include M signal input terminals 51 and N signal output terminals 52, where 1≤M<Q≤N, and M, Q, N are all positive integers.

The signal output terminals 41 of the first encoding circuit 40 and the signal input terminals 51 of the first decoding circuit 50 have a one-to-one correspondence. The signal output terminal 41 of the first encoding circuit 40 may be electrically connected to the signal input terminal 51 of the first decoding circuit 50 through one first signal line 61.

Each first gate drive circuit 21 may be connected to one signal output terminal 52 of the first decoding circuit 50 correspondingly.

For example, referring to FIG. 1, the display panel provided in one embodiment may include the display region AA and the non-display region NA surrounding the display region AA. The display region AA may have the display function, and the non-display region NA may be configured to dispose circuits and the like and may not be used for display function. The display region AA may include the plurality of fingerprint recognition units 10 arranged in an array along the first direction X and the second direction Y, where the first direction X intersects the second direction Y. Optionally, the first direction X and the second direction Y may be perpendicular to each other. The non-display region NA may include Q first gate drive circuits 21 arranged along the second direction Y. A first gate drive circuit 21 may be electrically connected to at least two rows of fingerprint recognition units 10 extending along the first direction X. The fingerprint recognition units 10 electrically connected to the first gate drive circuit 21 may be provided with a signal through the first gate drive circuit 21.

The non-display region NA may further include the drive chip 30, the first decoding circuit 50, and M first signal lines 61. The drive chip 30 may be on the side of the display region AA and arranged along the second direction Y with the display region. The drive chip 30 may include the first encoding circuit 40, and the first encoding circuit 40 may include M signal output terminals 41. The first decoding circuit 50 may include M signal input terminals 51 and N signal output terminals 52. The signal output terminals 41 of the first encoding circuit 40 and the signal input terminals 51 of the first decoding circuit 50 have a one-to-one correspondence. Moreover, the signal output terminal 41 of the first encoding circuit 40 may be electrically connected to the signal input terminal 51 of the first decoding circuit 50 through one first signal line 61, and each first gate drive circuit 21 may be connected to one signal output terminal 52 of the first decoding circuit 50 correspondingly, such that the drive chip provides a signal to the first gate drive circuit 21. The quantity of the first signal lines 61 between the first encoding circuit 40 and the first decoding circuit 50 is M, and the quantity of the first gate drive circuits 21 is Q, where M<Q. That is, by disposing the first encoding circuit 40 in the drive chip 30 and then disposing the first decoding circuit 50, it may implement that the drive chip 30 provides signals to a relatively large quantity of the first gate drive circuits 21 through a relatively small quantity of the first signal lines 61, which may effectively reduce the quantity of the signal lines and may be beneficial for implementing the narrow frame design of the display panel.

It should be noted that the quantity of the first gate drive circuits 21 is Q, and the quantity of the signal output terminals 52 of the first decoding circuit 50 is N, where Q≤N. FIG. 1 exemplarily illustrates that the quantity of the signal output terminals 52 of the first decoding circuit 50 and the quantity of the first gate drive circuits 21 are same, and the signal output terminals 52 of the first decoding circuit 50 and the first gate drive circuits 21 are connected in a one-to-one correspondence. In other embodiments of the present disclosure, the quantity of the signal output terminals 52 of the first decoding circuit 50 may be greater than the quantity of the first gate drive circuits 21, and each first gate drive circuit 21 may only need to be connected to one signal output terminal 52 of the first decoding circuit 50 correspondingly.

It can be understood that FIG. 1 exemplarily illustrates that the first gate drive circuit 21 is electrically connected to two rows of the fingerprint recognition units 10 extending along the first direction X. In other embodiments of the present disclosure, the first gate drive circuit 21 may be electrically connected to other quantities of rows of the fingerprint recognition units 10 extending along the first direction X, which may not be described in detail at the present disclosure. FIG. 1 exemplarily illustrates that the quantity of the first signal lines 61 is 5. In other embodiments of the present disclosure, the quantity of the first signal lines 61 may be other values, which may not be described in detail at the present disclosure.

Figure 2:
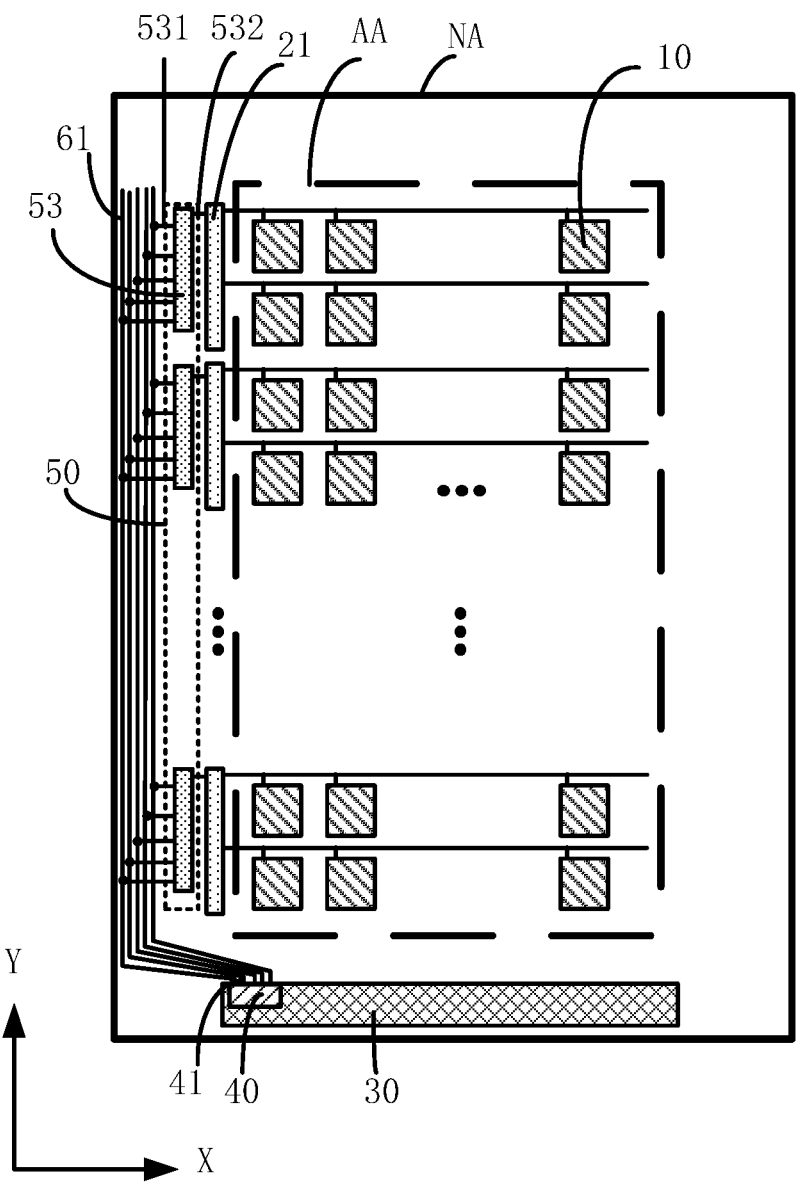
FIG. 2 illustrates a planar structural schematic of another exemplary display panel according to various embodiments of the present disclosure.

FIG. 2 illustrates a planar structural schematic of another display panel according to various embodiments of the present disclosure. Referring to FIG. 2, optionally, the first decoding circuit 50 may include N decoding units 53. The decoding unit 53 may include M signal input terminals 531 and one signal output terminal 532. The signal input terminals 531 of the decoding unit 53 and the first signal lines 61 may have a one-to-one correspondence, and the signal input terminal 531 of the decoding unit 53 may be electrically connected to a corresponding first signal line 61. Each first gate drive circuit 21 may be connected to the signal output terminal 532 of one decoding unit 53 correspondingly.

For example, referring to FIG. 2, the first decoding circuit 50 may include N decoding units 53. The decoding unit 53 may include M signal input terminals 531 and one signal output terminal 532. The signal input terminals 531 of the decoding unit 53 and the first signal lines 61 may have a one-to-one correspondence, and the signal input terminal 531 of the decoding unit 53 may be electrically connected to a corresponding first signal line 61. Each first gate drive circuit 21 may be connected to the signal output terminal 532 of one decoding unit 53 correspondingly. The control signal based on the first signal line 61 may be outputted, through the decoding unit 53, from the signal output terminal 532 of the decoding unit 53 to a corresponding first gate drive circuit 21.

Figure 3:
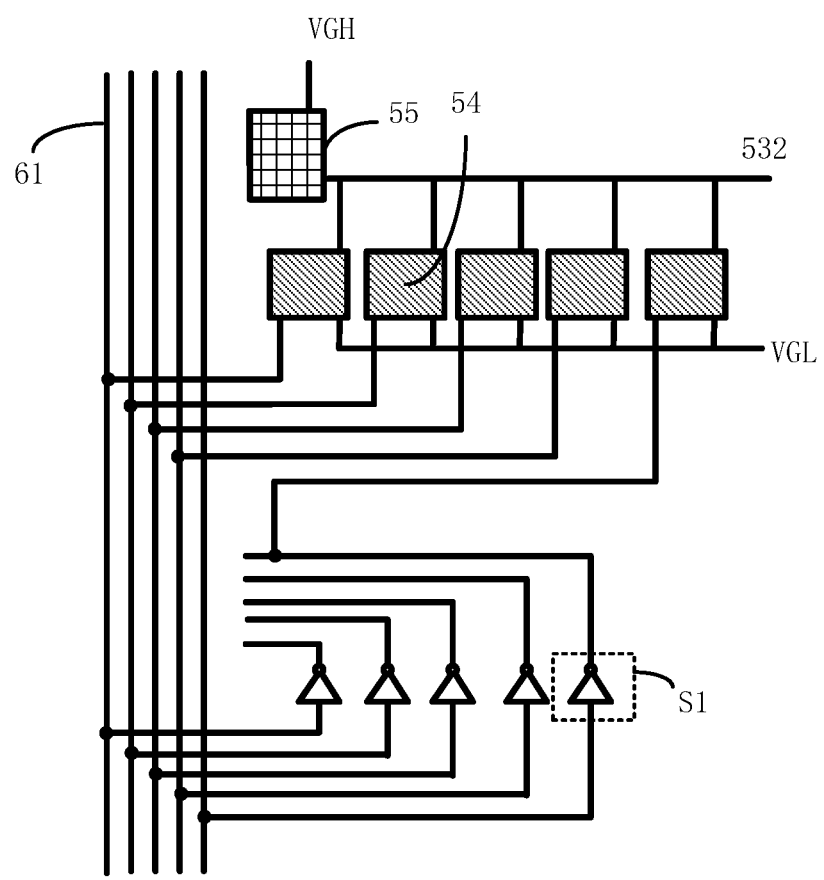
FIG. 3 illustrates a structural schematic of a decoding unit according to various embodiments of the present disclosure.

FIG. 3 illustrates a structural schematic of the decoding unit according to various embodiments of the present disclosure. Referring to FIGS. 2-3, optionally, the decoding unit 53 may include M first switch modules 54, one second switch module 55, and M inverters 51.

The first terminal of the second switch module 55 may be electrically connected to a first voltage signal terminal VGH, and the second terminal of the second switch module 55 may be electrically connected to the signal output terminal 532 of the decoding unit 53.

The first switch modules 54 and the first signal lines 61 may have a one-to-one correspondence. The control terminal of the first switch module 54 may be electrically connected to a corresponding first signal line 61, the first terminal of the first switch module 54 may be electrically connected to a second voltage signal terminal VGL, and the second terminal of the first switch module 54 may be electrically connected to the signal output terminal 532 of the decoding unit 53.

The control terminal of the first switch module 54 may be electrically connected to the corresponding first signal line 61 through one inverter S1, or electrically connected to the corresponding first signal line 61 directly.

For example, referring to FIGS. 2-3, the decoding unit 53 may include M first switch modules 54, one second switch module 55, and M inverters 51. The control terminal of the first switch module 54 may be electrically connected to the corresponding first signal line 61 through one inverter S1, or electrically connected to the corresponding first signal line 61 directly. Moreover, the connections between the control terminals of the first switch modules 54 in all decoding units 53 in the first decoding circuit 50 and the first signal lines 61 may be different. Therefore, all decoding units 53 in the first decoding circuit 50 may be controlled to respectively output enable signals to the first gate drive circuits 32 through fewer first signal lines 61.

It should be noted that FIG. 3 exemplarily illustrates a structural schematic of one decoding unit 53 in the first decoding circuit 50. The structures of other decoding units 53 in the first decoding circuit 50 may be configured with reference to FIG. 3, which may not be described in detail in one embodiment.

Figure 4:
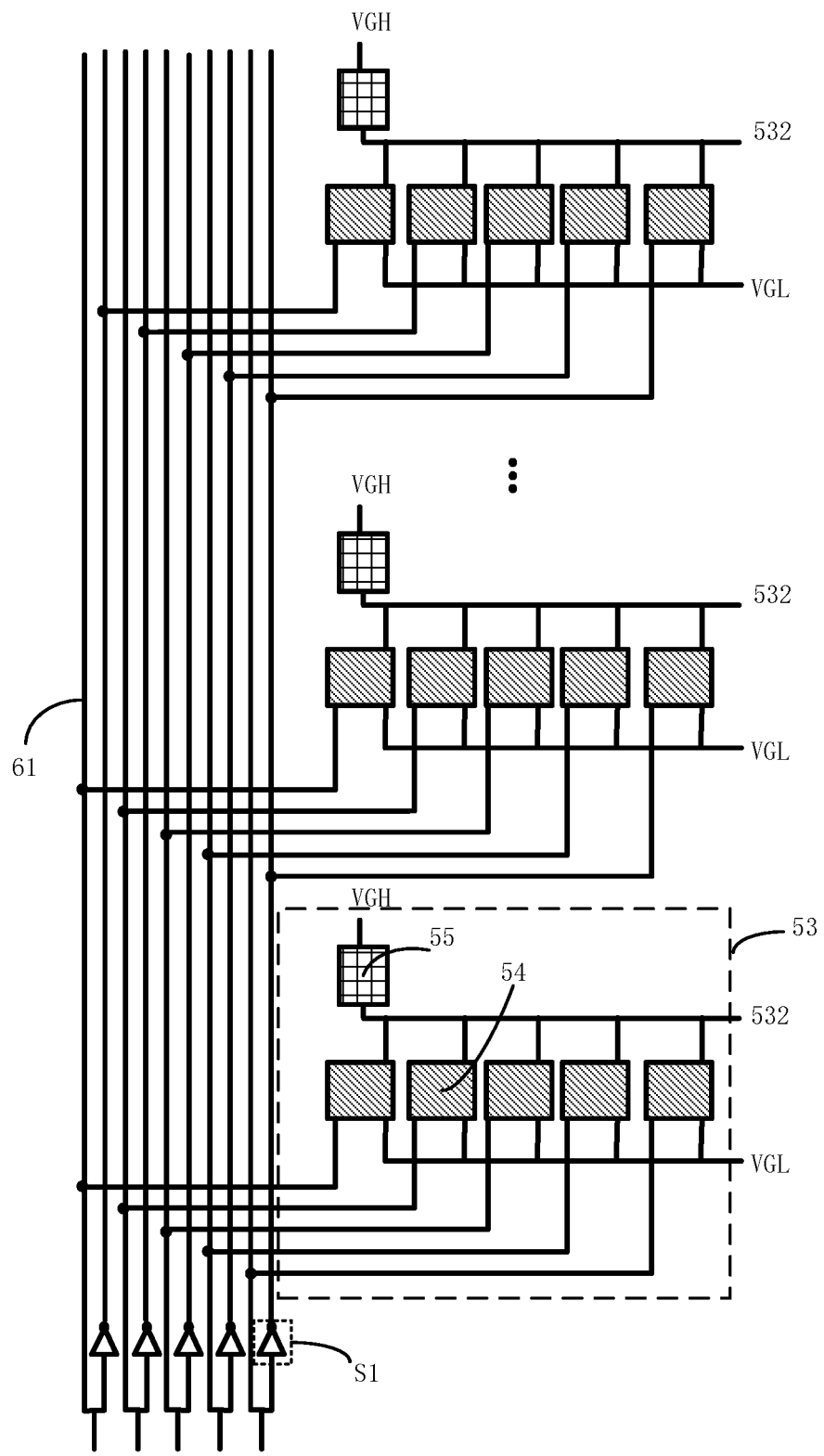
FIG. 4 illustrates a structural schematic of another decoding unit according to various embodiments of the present disclosure.

FIG. 4 illustrates a structural schematic of another decoding unit according to various embodiments of the present disclosure. Referring to FIG. 4, the decoding circuit may further include M inverters 51. One terminal of the inverter S1 may be electrically connected to a corresponding first signal line 61. The decoding unit 53 may include M first switch modules 54, and one second switch module 55. All encoding units 53 in the decoding circuit may share the inverters 51. The control terminal of the first switch module 54 in each decoding unit 53 may be electrically connected to a corresponding first signal line 61 through one inverter S1, or electrically connected to the corresponding first signal line 61 directly.

Figure 5:
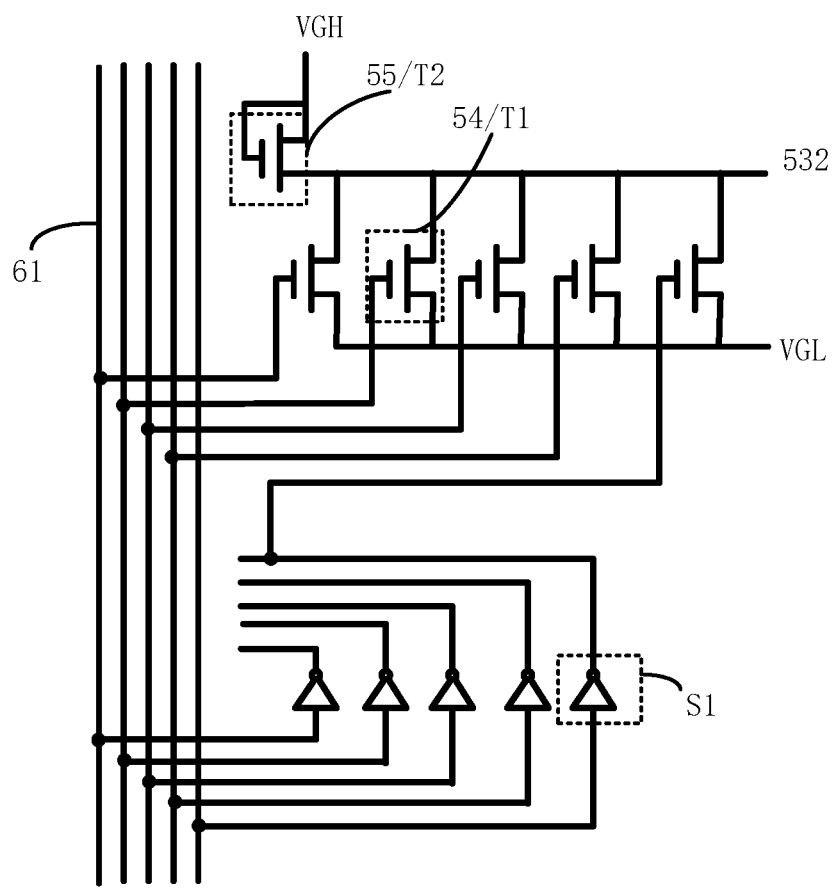
FIG. 5 illustrates a circuit diagram of another decoding unit according to various embodiments of the present disclosure.

FIG. 5 illustrates a circuit diagram of another decoding unit according to various embodiments of the present disclosure. Referring to FIG. 5, optionally, the first switch module 54 may include a first switch T1, and the second switch module 55 may include a second switch T2.

The gate electrode and the first electrode of the second switch T2 may both be electrically connected to the first voltage signal terminal VGH, and the second electrode of the second switch T2 may be electrically connected to the signal output terminal 532 of the decoding unit.

The first switches T1 and the first signal lines 61 may have a one-to-one correspondence. The gate electrode of each first switch T1 may be electrically connected to a corresponding first signal line 61, all first electrodes of the first switches T1 may be electrically connected to the second voltage signal terminal VGL, and all second electrodes of the first switches T1 may be electrically connected to the signal output terminal 532 of the decoding unit.

The gate electrode of the first switch T1 may be electrically connected to the corresponding first signal line 61 through one inverter S1, or electrically connected to the corresponding first signal line 61 directly.

For example, referring to FIG. 5, the first switch module 54 may include first switches T1, and the second switch module 55 may include the second switch T2. The gate electrode and the first electrode of the second switch T2 may both be electrically connected to the first voltage signal terminal VGH, and the second electrode of the second switch T2 may be electrically connected to the signal output terminal 532 of the decoding unit. The first switches T1 and the first signal lines 61 may have a one-to-one correspondence. The gate electrode of each first switch T1 may be electrically connected to a corresponding first signal line 61, all first electrodes of the first switches T1 may be electrically connected to the second voltage signal terminal VGL, and all second electrodes of the first switches T1 may be electrically connected to the signal output terminal 532 of the decoding unit. When at least one first switch T1 is in conduction, the signal output terminal 532 of the decoding unit may output the signal of the second voltage signal terminal VGL. When all first switches T1 are cutoff, the signal output terminal 532 of the decoding unit may output the signal of the first voltage signal terminal VGH.

It should be noted that FIG. 5 exemplarily illustrates a circuit diagram of one decoding unit in the first decoding circuit. The structures of other decoding units in the first decoding circuit may be configured with reference to FIG. 5, which may not be described in detail in one embodiment.

Figure 6:
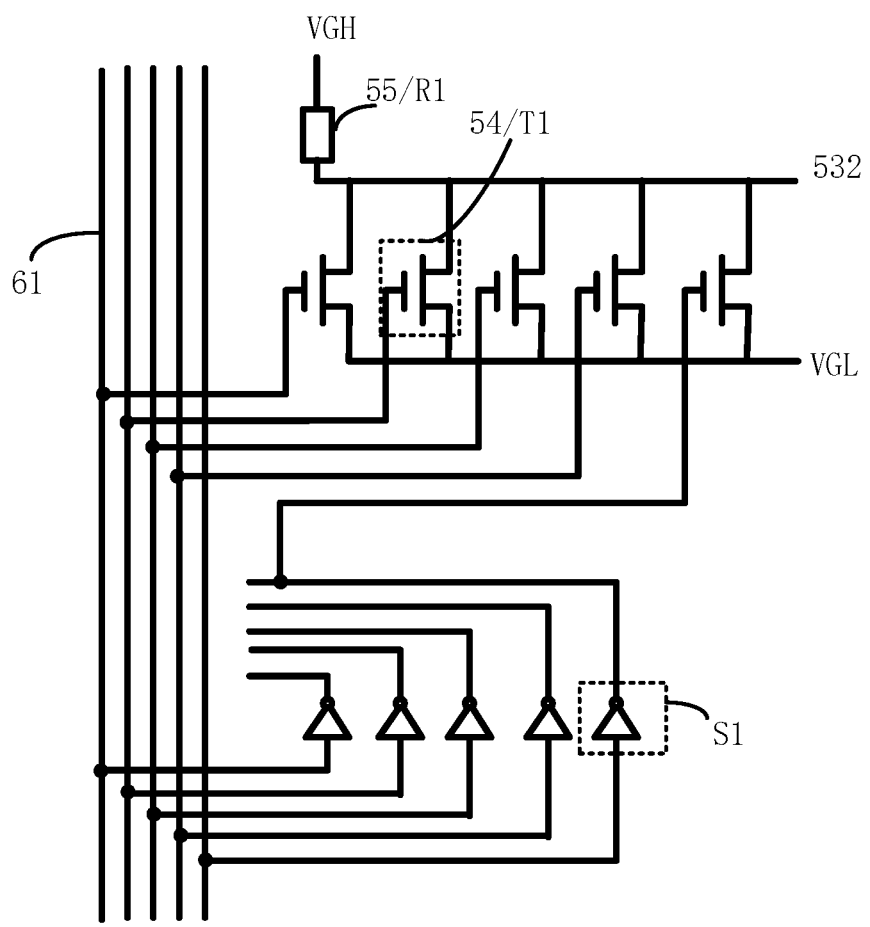
FIG. 6 illustrates a circuit diagram of another decoding unit according to various embodiments of the present disclosure.

FIG. 6 illustrates a circuit diagram of another decoding unit according to various embodiments of the present disclosure. Referring to FIG. 6, optionally, the first switch module 54 may include the first switch T1, and the second switch module 55 may include a first resistor R1.

The first electrode of the first resistor R1 may be electrically connected to the first voltage signal terminal VGH, and the second electrode of the first resistor R1 may be electrically connected to the signal output terminal 532 of the decoding unit.

The first switches T1 and the first signal lines 61 may have a one-to-one correspondence. The gate electrode of the first switch T1 may be electrically connected to a corresponding first signal line 61, all first electrodes of the first switches T1 may be electrically connected to the second voltage signal terminal VGL, and all second electrodes of the first switches T1 may be electrically connected to the signal output terminal 532 of the decoding unit.

The gate electrode of the first switch T1 may be electrically connected to a corresponding first signal line 61 through one inverter S1, or electrically connected to the corresponding first signal line 61 directly.

For example, referring to FIG. 6, the first switch module 54 may include first switches T1, and the second switch module 55 may include the first resistor R1. The first electrode of the first resistor R1 may be electrically connected to the first voltage signal terminal VGH, and the second electrode of the first resistor R1 may be electrically connected to the signal output terminal 532 of the decoding unit. The first switches T1 and the first signal lines 61 may have a one-to-one correspondence. The gate electrode of each first switch T1 may be electrically connected to the corresponding first signal line 61, all first electrodes of the first switches T1 may be electrically connected to the second voltage signal terminal VGL, and all second electrodes of the first switches T1 may be electrically connected to the signal output terminal 532 of the decoding unit. When at least one first switch T1 is in conduction, the signal output terminal 532 of the decoding unit may output the signal of the second voltage signal terminal VGL. When all first switches T1 are cutoff, the signal output terminal 532 of the decoding unit may output the signal of the first voltage signal terminal VGH.

It should be noted that FIG. 6 exemplarily illustrates a circuit diagram of one decoding unit in the first decoding circuit. The structures of other decoding units in the first decoding circuit may be configured with reference to FIG. 6, which may not be described in detail in one embodiment.

FIGS. 5-6 exemplarily illustrate the circuit diagrams of the decoding units, respectively. In other embodiments of the present disclosure, other circuit structures may also be used in the decoding unit, which may not be described in detail at the present disclosure.

Figure 7:
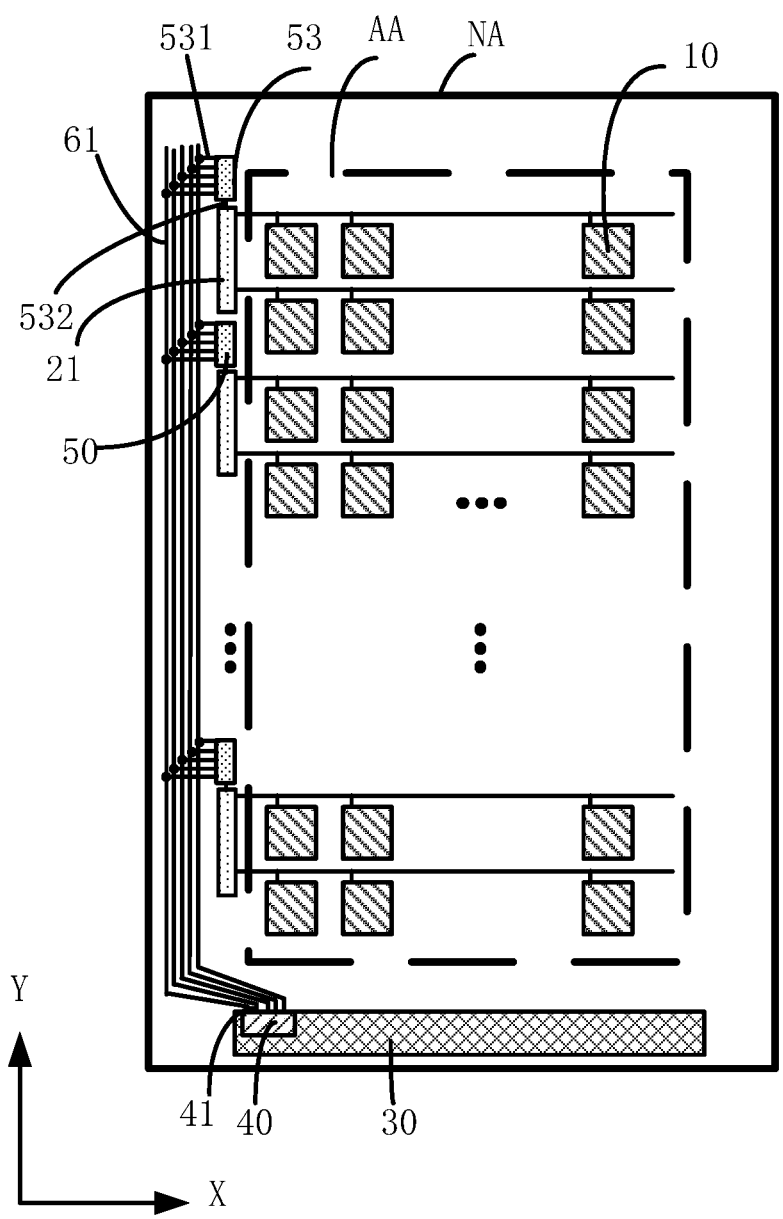
FIG. 7 illustrates a planar structural schematic of another exemplary display panel according to various embodiments of the present disclosure.

FIG. 7 illustrates a planar structural schematic of another display panel according to various embodiments of the present disclosure. Referring to FIG. 7, optionally, the decoding unit 53 may be on the side of first gate drive circuit 21, electrically connected to the decoding unit 53, along the second direction Y.

For example, referring to FIG. 7, the decoding unit 53 may be on the side of first gate drive circuit 21, electrically connected to the decoding unit 53, along the second direction Y, which may be beneficial for further implementing the narrow frame design of the display panel.

Figure 8:
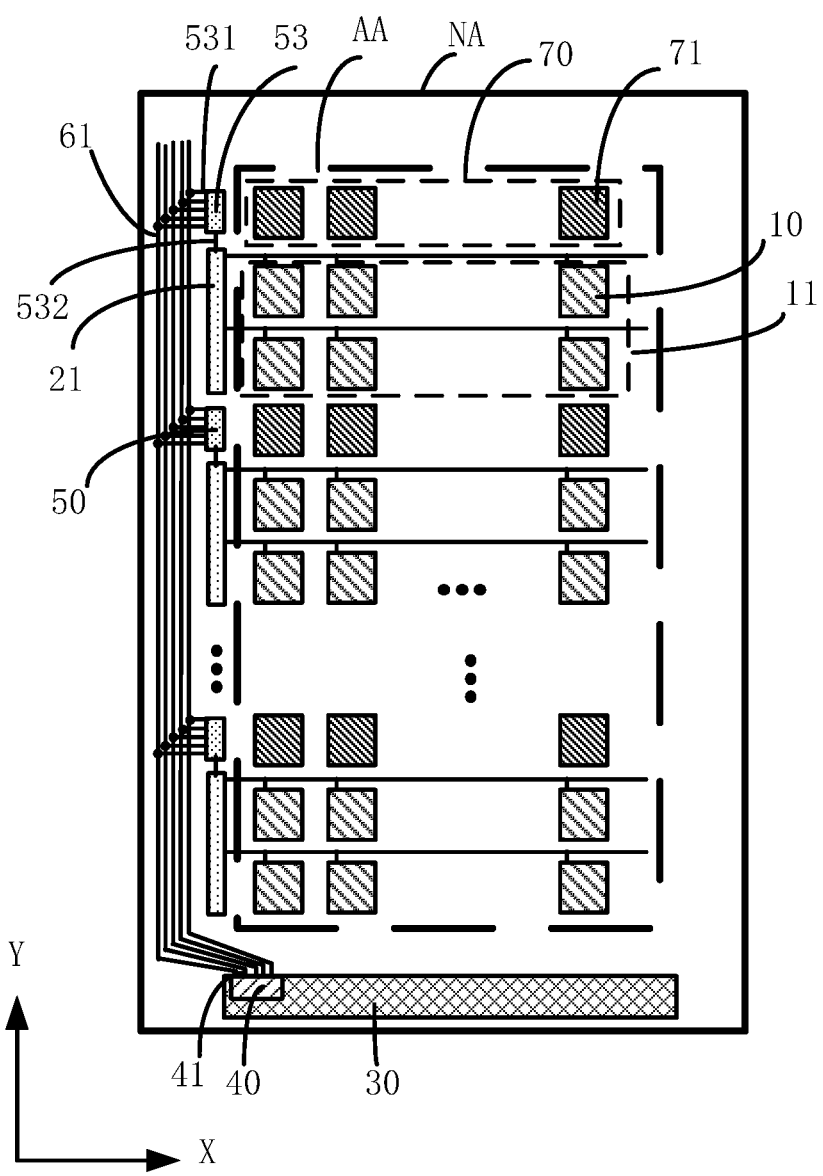
FIG. 8 illustrates a planar structural schematic of another exemplary display panel according to various embodiments of the present disclosure.

FIG. 8 illustrates a planar structural schematic of another display panel according to various embodiments of the present disclosure. Referring to FIG. 8, optionally, the display panel may further include N virtual unit groups 70, and the virtual unit group 70 may include at least one row of virtual units 71 arranged along the first direction X.

The fingerprint recognition units 10 electrically connected to a same first gate drive circuit 21 may be a fingerprint recognition group 11, and the first gate drive circuit 21 may be on the side of the fingerprint recognition group 11, electrically connected to the first gate drive circuit 21, along the first direction X.

The virtual unit groups 70 and the decoding units 53 may have a one-to-one correspondence. The decoding unit 53 may be on the side of a corresponding virtual unit group 70 along the first direction X.

For example, referring to FIG. 8, the first gate drive circuit 21 may be on the side of the fingerprint recognition group 11, electrically connected to the first gate drive circuit 21, along the first direction X. The display panel may further include N virtual unit groups 70, and the virtual unit group 70 may include at least one row of virtual units 71 arranged along the first direction X. The virtual unit groups 70 and the decoding units 53 may have a one-to-one correspondence. The decoding unit 53 may be on the side of the corresponding virtual unit group 70 along the first direction X. By disposing the virtual unit groups 70, the decoding unit 53 may be disposed on the side of the corresponding virtual unit group 70 along the first direction X when the size of the first gate drive circuit 21 is not changed, which may be beneficial for further implementing the narrow frame design of the display panel.

Referring to FIG. 8, optionally, the decoding unit 53 may be on the side of the first gate drive circuit 21, electrically connected to the decoding unit 53, away from the drive chip 30.

It may be understood that one embodiment exemplarily describes that the decoding unit 53 may be on the side of the first gate drive circuit 21, electrically connected to the decoding unit 53, away from the drive chip 30. In other embodiments of the present disclosure, the decoding unit 53 may also be on the side of the first gate drive circuit 21, electrically connected to the decoding unit 53, adjacent to the drive chip 30 based on the circuit configuration of the first gate drive circuit 21, which may not be described in detail at the present disclosure.

Referring to FIG. 8, optionally, the quantities of rows of the fingerprint recognition units 10 arranged along the first direction X in all fingerprint recognition groups 11 may be same.

For example, the quantities of rows of the fingerprint recognition units 10 arranged along the first direction X in all fingerprint recognition groups 11 of the display panel may be same. Therefore, the quantities of rows of the fingerprint recognition units 10, which are arranged along the first direction X and electrically connected to all first gate drive circuits 21, may be same, thereby conveniently controlling the fingerprint recognition units 10 in the display panel and improving the fingerprint recognition accuracy.

Referring to FIG. 8, optionally, the quantities of rows of the virtual units 71 arranged along the first direction X in all virtual unit groups 70 may be same.

For example, the quantities of rows of the virtual units 71 arranged along the first direction X in all virtual unit groups 70 may be same, and the quantities of rows of the virtual units 71 arranged along the first direction X between two adjacent fingerprint recognition groups 11 may be same.

Therefore, each virtual unit group 70 may have a same effect on a corresponding fingerprint recognition group 11, thereby further improving the fingerprint recognition accuracy of the display panel.

It should be noted that FIG. 8 exemplarily illustrates that the quantities of rows of the virtual units 71 arranged in the first direction X in all virtual unit groups 70 may be one. In other embodiments of the present disclosure, the quantities of rows of the virtual units 71 arranged in the first direction X in all virtual unit groups 70 may be other values, which may not be described in detail at the present disclosure.

Figure 9:
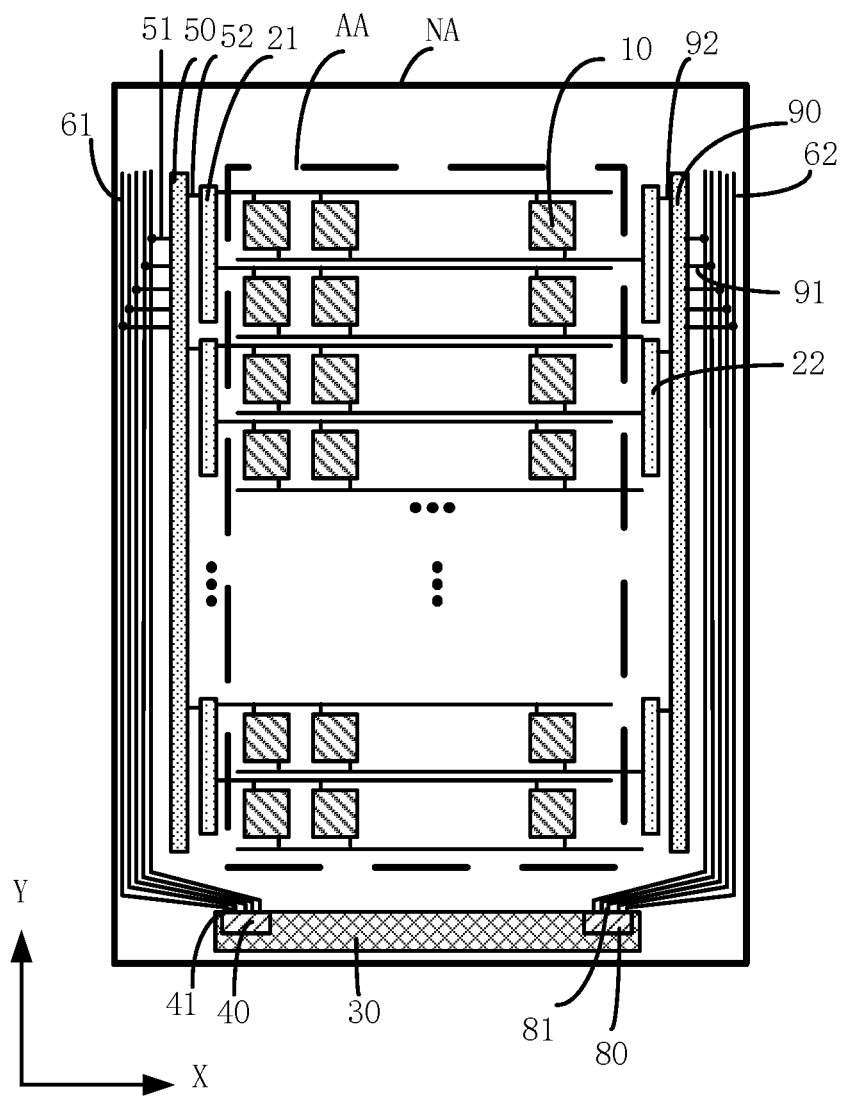
FIG. 9 illustrates a planar structural schematic of another exemplary display panel according to various embodiments of the present disclosure.

FIG. 9 illustrates a planar structural schematic of another display panel according to various embodiments of the present disclosure. Referring to FIG. 9, the non-display region NA may further include Q second gate drive circuits 22 arranged along the second direction Y.

The second gate drive circuit 22 may be electrically connected to at least two rows of fingerprint recognition units 10 extending along the first direction X.

The drive chip 30 may include a second encoding circuit 80, and the second encoding circuit 80 may include M signal output terminals 81.

The non-display region NA may further include a second decoding circuit 90 and M second signal lines 62. The second decoding circuit 90 may include M signal input terminals 91 and N signal output terminals 92.

The signal output terminals 81 of the second encoding circuit 80 and the signal input terminals 91 of the second decoding circuit 90 have a one-to-one correspondence. The signal output terminal 81 of the second encoding circuit 80 may be electrically connected to the signal input terminal 91 of the second decoding circuit 90 through one second signal line 62.

Each second gate drive circuit 22 may be connected to one signal output terminal 81 of the second decoding circuit 80 correspondingly.

The second encoding circuit 80 may be same as the first encoding circuit 40, and the second decoding circuit 90 may be same as the first decoding circuit 50.

For example, referring to FIG. 9, the non-display region NA may further include Q second gate drive circuits 22 arranged along the second direction Y. The second gate drive circuit 22 may be electrically connected to at least two rows of fingerprint recognition units 10 extending along the first direction X. The fingerprint recognition units 10 electrically connected to the second gate drive circuit 22 may be provided with a signal through the second gate drive circuit 22.

The non-display region NA may further include the second decoding circuit 90 and M second signal lines 62. The drive chip 30 may include the second encoding circuit 80, and the second encoding circuit 80 may include M signal output terminals 81. The second decoding circuit 90 may include M signal input terminals 91 and N signal output terminals 92. The signal output terminals 81 of the second encoding circuit 80 and the signal input terminals 91 of the second decoding circuit 90 have a one-to-one correspondence. The signal output terminal 81 of the second encoding circuit 80 may be electrically connected to the signal input terminal 91 of the second decoding circuit 90 through one second signal line 62. Each second gate drive circuit 22 may be connected to one signal output terminal 81 of the second decoding circuit 80 correspondingly. The second encoding circuit 80 may be same as the first encoding circuit 40, and the second decoding circuit 90 may be same as the first decoding circuit 50. In such way, the drive chip 30 may be implemented to provide signals to a relatively large quantity of the second gate drive circuits 22 through a relatively small quantity of the second signal lines 62, which may effectively reduce the quantity of the signal lines and be beneficial for implementing the narrow frame design of the display panel.

It should be noted that FIG. 9 exemplarily illustrates the quantity of the signal output terminals 92 of the second decoding circuit 90 and the quantity of the second gate drive circuits 22 are same, and the signal output terminals 92 of the second decoding circuit 90 and the second gate drive circuits 22 are connected in a one-to-one correspondence. In other embodiments of the present disclosure, the quantity of the signal output terminals 92 of the second decoding circuit 90 may be greater than the quantity of the second gate drive circuits 22, and each second gate drive circuit 22 may only need to be connected to one signal output terminal 92 of the second decoding circuit 90.

It can be understood that FIG. 9 exemplarily illustrates that the second gate drive circuit 22 is electrically connected to two rows of the fingerprint recognition units 10 extending along the first direction X. In other embodiments of the present disclosure, the second gate drive circuit 22 may be electrically connected to other quantities of rows of the fingerprint recognition units 10 extending along the first direction X, which may not be described in detail at the present disclosure. FIG. 9 exemplarily illustrates the quantity of the second signal lines 62 is 5. In other embodiments of the present disclosure, the quantity of the second signal lines 62 may be other values, which may not be described in detail in the present disclosure.

Figure 10:
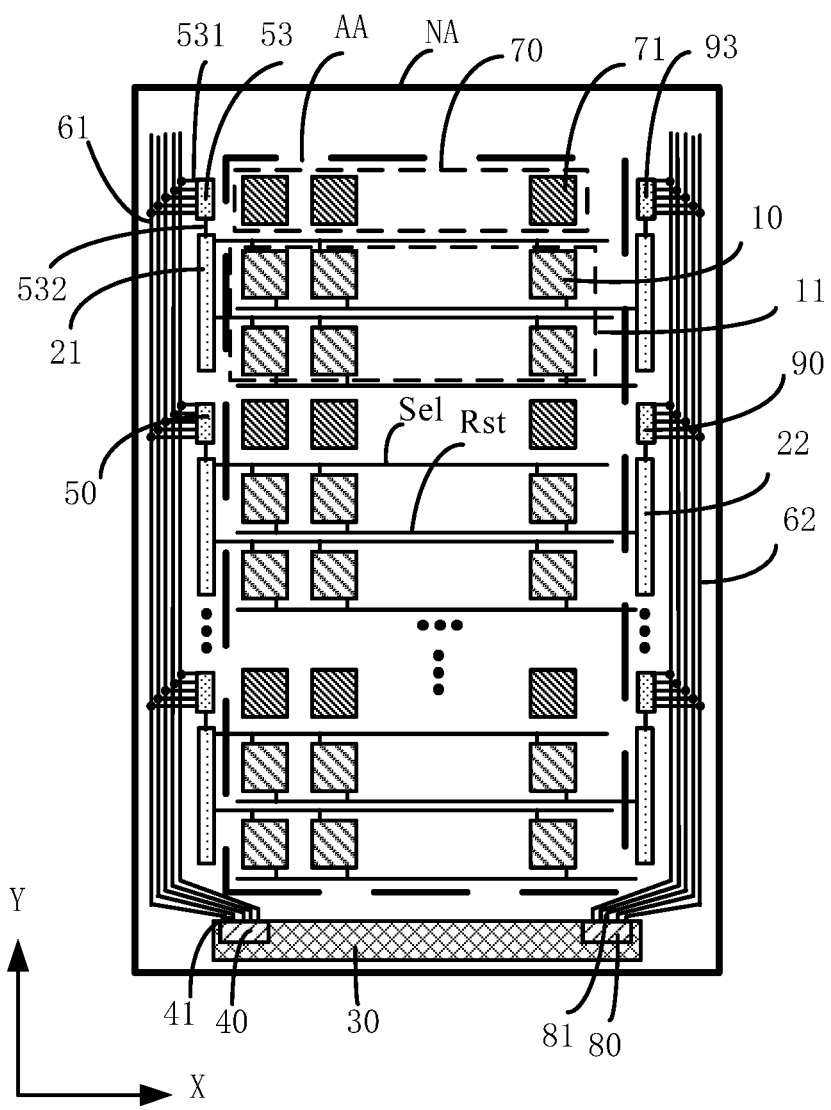
FIG. 10 illustrates a planar structural schematic of another exemplary display panel according to various embodiments of the present disclosure.

FIG. 10 illustrates a planar structural schematic of another display panel according to various embodiments of the present disclosure. Referring to FIG. 10, optionally, the first gate drive circuits 21 and the second gate drive circuits 22 may respectively be on two sides of the display region AA along the first direction X.

For example, the first gate drive circuits 21 and the second gate drive circuits 22 may respectively be on two sides of the display region AA along the first direction X, which may avoid that the first gate drive circuits 21 and the second gate drive circuits 22 are both disposed on the same side of the display region AA, thereby further facilitating the implementation of the narrow frame design of the display panel.

Referring to FIG. 10, optionally, the first gate drive circuits 21 and the second gate drive circuits 22 may have a one-to-one correspondence. The first gate drive circuit 21 and its corresponding the second gate drive circuit 22 may be electrically connected to a same fingerprint recognition unit 10.

For example, the first gate drive circuit 21 and its corresponding the second gate drive circuit 22 may be electrically connected to a same fingerprint recognition unit 10. The drive method of the first gate drive circuit 21 may be the same as the drive method of the second gate drive circuit 22, which may effectively improve the drive capacity of the display panel and reduce power consumption.

Referring to FIG. 10, optionally, the display panel may further include a plurality of first control signal lines Rst extending along the first direction X and a plurality of second control signal lines Se1 extending along the first direction X. The fingerprint recognition units 10 arranged along the first direction X may be electrically connected to a same first control signal line Rst and a same second control signal line Se1.

For example, the display panel may further include the plurality of first control signal lines Rst extending along the first direction X and the plurality of second control signal lines Se1 extending along the first direction X. The first control signal line Rst may be electrically connected to the second gate drive circuit 22, and the second control signal line Se1 may be electrically connected to the first gate drive circuit 21. A signal may be provided to the fingerprint recognition units 10 arranged in the first direction X through a same first control signal line Rst, and a signal may be provided to the fingerprint recognition units 10 arranged in the first direction X through a same second control signal line Se1.

Figure 11:
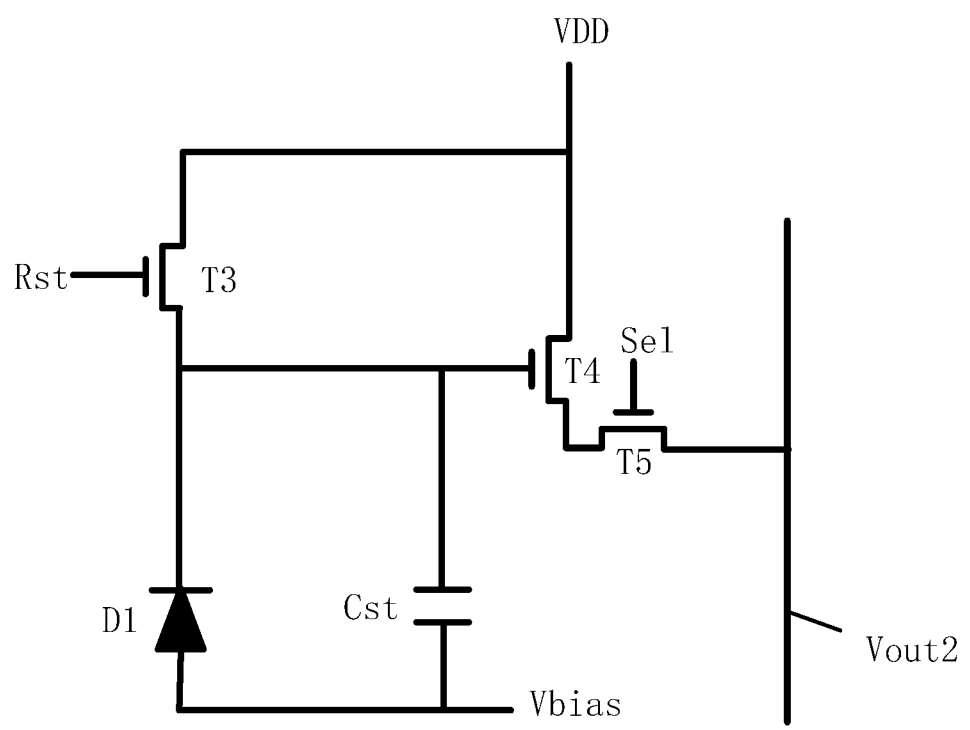
FIG. 11 illustrates a circuit diagram of a fingerprint recognition unit according to various embodiments of the present disclosure.

FIG. 11 illustrates a circuit diagram of a fingerprint recognition unit according to various embodiments of the present disclosure. Optionally, the fingerprint recognition unit may include a first transistor T3, a second transistor T4, a third transistor T5, a first capacitor Cst, and a photodiode D1.

The gate electrode of the first transistor T3 may be electrically connected to the first control signal line Rst, the first electrode of the first transistor T3 may be electrically connected to the first electrode of the photodiode D1, and the second electrode of the first transistor T3 may be connected to a third voltage signal terminal VDD.

The gate electrode of the second transistor T4 may be electrically connected to the first electrode of the photodiode D1, the first electrode of the second transistor T4 may be electrically connected to the first electrode of the third transistor T5, and the second electrode of the second transistor T4 may be connected to the third voltage signal terminal VDD.

The gate electrode of the third transistor T5 may be electrically connected to the second control signal line Se1, and the second electrode of the third transistor T5 may be connected to a fingerprint signal output terminal Vout2.

The second electrode of the photodiode D1 may be electrically connected to a reference voltage terminal Vbias.

The first terminal of the first capacitor Cst may be electrically connected to the first electrode of the photodiode D1, and the second terminal of the first capacitor Cst may be electrically connected to the second electrode of the photodiode D1.

The fingerprint recognition stage may include a reset stage, an exposure stage, and an electrical signal output stage.

For example, at the reset stage, the first transistor T3 may be in conduction in response to the control signal transmitted by the first control signal line Rst, such that the fingerprint recognition unit 10 may be reset.

At the exposure stage, the first transistor T3 may be cutoff in response to the control signal transmitted by the first control signal line Rst, and the third transistor T5 may be cutoff in response to the control signal transmitted by the second control signal line Se1. If a finger touches the screen, the light from a light source may be reflected when reaching the valley line and the ridge line of the fingerprint. Due to different reflection angles of the valley line and the ridge line and different reflected light intensity, the light may be projected onto the photodiode D1 to cause the resistance of the photodiode D1 to change, thereby generating electrical charges to from a photocurrent.

At the electrical signal output stage, the third transistor T5 may be in conduction in response to the control signal transmitted by the second control signal line Se1; the second transistor T4 may be in conduction; the photocurrent may flow through the second transistor T4 to generate a voltage signal; and the voltage signal may pass through the conducting third transistor T5 and then be outputted through the fingerprint signal output terminal Vout2.

The fingerprint recognition unit provided in one embodiment of the present disclosure is a 3T1D structure. Compared with the 1T1D circuit structure of the existing technology, the 3T1D structure may have stronger anti-interference capability and improve the signal-to-noise ratio. Obviously, the fingerprint recognition circuit may also be other circuit structure, such as a 4T1D structure.

A display device, including the above-mentioned display panel, is provided by one embodiment.

Figure 12:
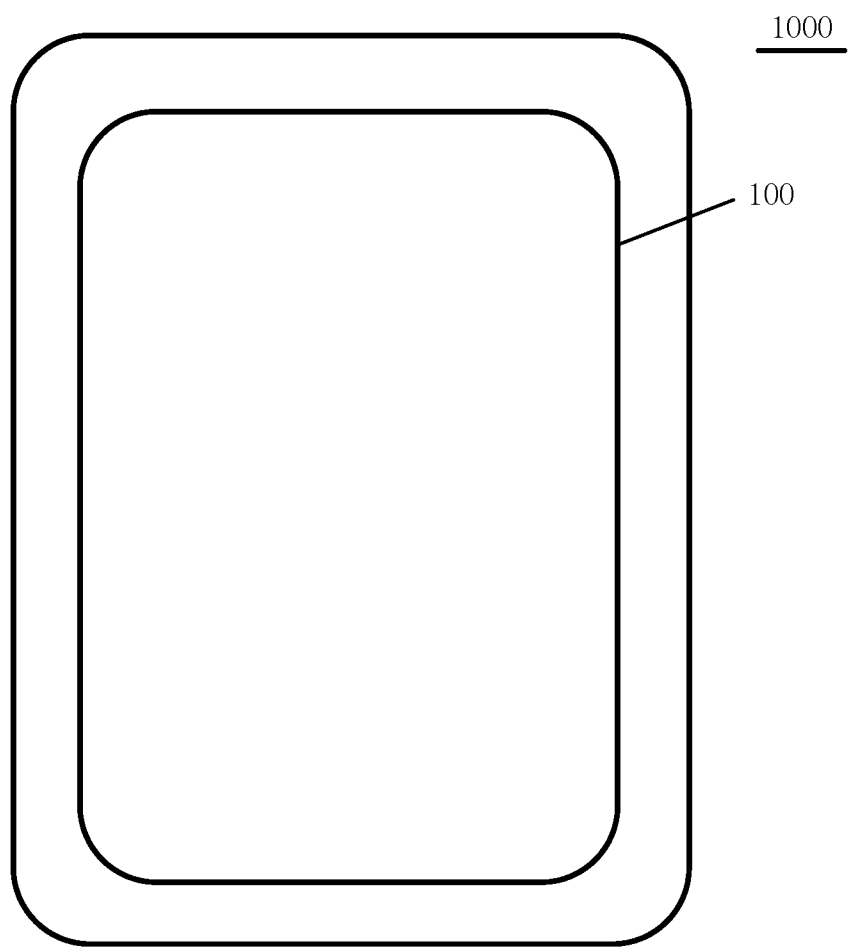
FIG. 12 illustrates a planar structural schematic of an exemplary display device according to various embodiments of the present disclosure.

Referring to FIG. 12, FIG. 12 illustrates a planar structural schematic of a display device according to various embodiments of the present disclosure. The display device 1000 provided in FIG. 12 may include a display panel 100 which is provided by any one of the above-mentioned embodiments of the present disclosure. The embodiment shown in FIG. 12 may only use a mobile phone as an example to describe the display device 1000. It may be understood that the display device provided by the embodiments of the present disclosure may be a display device with a display function, such as a computer, a TV, a car display device, and the like, which may not be limited by the present disclosure. The display device provided by the embodiments of the present disclosure may have the beneficial effects of the display panel provided by the embodiments of the present disclosure, and the details may refer to the description of the display panel in the above-mentioned embodiments, which may not be described in detail in one embodiment.

From the above-mentioned embodiments, it can be seen that the display panel and the display device provided by the present disclosure may achieve at least the following beneficial effects.

The display panel provided by the present disclosure may include the display region and the non-display region surrounding the display region. The display region may include the plurality of fingerprint recognition units arranged in an array along the first direction X and the second direction Y. The non-display region may include Q first gate drive circuits arranged along the second direction. The first gate drive circuit may be electrically connected to at least two rows of fingerprint recognition units extending along the first direction. The fingerprint recognition units electrically connected to the first gate drive circuit may be provided with a signal through the first gate drive circuit. The non-display region may further include the drive chip, the first decoding circuit, and M first signal lines. The drive chip may be on the side of the display region and arranged along the second direction Y with the display region. The drive chip may include the first encoding circuit, and the first encoding circuit may include M signal output terminals. The first decoding circuit may include M signal input terminals and N signal output terminals. The signal output terminals of the first encoding circuit and the signal input terminals of the first decoding circuit have a one-to-one correspondence. Moreover, the signal output terminal of the first encoding circuit may be electrically connected to the signal input terminal of the first decoding circuit through one first signal line, and each first gate drive circuit may be connected to one signal output terminal of the first decoding circuit correspondingly, such that the drive chip provides a signal to the first gate drive circuit. The quantity of the first signal lines between the first encoding circuit and the first decoding circuit is M, and the quantity of the first gate drive circuits is Q, where M<Q. That is, by disposing the first encoding circuit in the drive chip and then disposing the first decoding circuit, the drive chip may be implemented to provide signals to a relatively large quantity of the first gate drive circuits through a relatively small quantity of the first signal lines, which may effectively reduce the quantity of the signal lines and be beneficial for implementing the narrow frame design of the display panel.

Although certain embodiments of the present disclosure have been described in detail through examples, those skilled in the art should understand that the above-mentioned examples are merely for illustration, not for limiting the scope of the present disclosure. Those skilled in the art should understand that the above-mentioned embodiments may be modified without departing from the scope and spirit of the present disclosure, and the scope of the disclosure may be defined by the appended claims.

What is claimed is:

1. A display panel, comprising:
a display region and a non-display region surrounding the display region, wherein:
the display region includes a plurality of fingerprint recognition units arranged in an array along a first direction and a second direction, wherein the first direction intersects the second direction;
the non-display region includes a drive chip and Q first gate drive circuits arranged along the second direction, wherein:
the drive chip is on a side of the display region and arranged along the second direction with the display region;
a first gate drive circuit is electrically connected to at least two rows of fingerprint recognition units extending along the first direction; and
the drive chip includes a first encoding circuit including M signal output terminals; and
the non-display region further includes a first decoding circuit and M first signal lines, wherein the first decoding circuit includes M signal input terminals and N signal output terminals, wherein $1 \leq M < Q \leq N$, and M, Q, N are all positive integers;
the signal output terminals of the first encoding circuit and the signal input terminals of the first decoding circuit have a one-to-one correspondence; and a signal output terminal of the first encoding circuit is electrically connected to a corresponding signal input terminal of the first decoding circuit through one first signal line; and
each first gate drive circuit is connected to one signal output terminal of the first decoding circuit correspondingly.

2. The display panel according to claim 1, wherein:
the first decoding circuit includes N decoding units; a decoding unit includes M signal input terminals and one signal output terminal; the signal input terminals of the decoding unit and the first signal lines have a one-to-one correspondence; a signal input terminal of the decoding unit is electrically connected to a corresponding first signal line; and each first gate drive circuit is connected to one signal output terminal of the decoding unit correspondingly.

3. The display panel according to claim 2, wherein:
the decoding unit includes M first switch modules, one second switch module, and M inverters;
a first terminal of the second switch module is electrically connected to a first voltage signal terminal, and a second terminal of the second switch module is electrically connected to the signal output terminal of the decoding unit;
the first switch modules and the first signal lines have a one-to-one correspondence; a control terminal of a first switch module is electrically connected to a corresponding first signal line; a first terminal of each first switch module is electrically connected to a second voltage signal terminal; and a second terminal of each first switch module is electrically connected to the signal output terminal of the decoding unit; and
the control terminal of the first switch module is electrically connected to the corresponding first signal line through one inverter, or electrically connected to the corresponding first signal line directly.

4. The display panel according to claim 3, wherein:
the first switch module includes a first switch, and the second switch module includes a second switch;
a gate electrode and a first electrode of the second switch are both electrically connected to the first voltage signal terminal, and a second electrode of the second switch is electrically connected to the signal output terminal of the decoding unit;
the first switches and the first signal lines have a one-to-one correspondence; a gate electrode of the first switch is electrically connected to a corresponding first signal line, a first electrode of each first switch is electrically connected to the second voltage signal terminal, and a second electrode of each first switch is electrically connected to the signal output terminal of the decoding unit; and
the gate electrode of the first switch is electrically connected to the corresponding first signal line through an inverter, or electrically connected to the corresponding first signal line directly.

5. The display panel according to claim 3, wherein:
the first switch module includes a first switch, and the second switch module includes a first resistor;
a first electrode of the first resistor is electrically connected to the first voltage signal terminal, and a second electrode of the first resistor is electrically connected to the signal output terminal of the decoding unit;
the first switches and the first signal lines have a one-to-one correspondence; a gate electrode of the first switch is electrically connected to a corresponding first signal line, a first electrode of each first switch is electrically connected to the second voltage signal terminal, and a second electrode of each first switch is electrically connected to the signal output terminal of the decoding unit; and
the gate electrode of the first switch is electrically connected to the corresponding first signal line through an inverter, or electrically connected to the corresponding first signal line directly.

6. The display panel according to claim 3, wherein:
the decoding unit is configured on a side of the first gate drive circuit electrically connected thereto along the second direction.

7. The display panel according to claim 6, further including:
N virtual unit groups, wherein:
a virtual unit group includes at least one row of virtual units arranged along the first direction;
the fingerprint recognition units electrically connected to a same first gate drive circuit form a fingerprint recognition group, and the first gate drive circuit is on a side of the fingerprint recognition group which is electrically connected to the first gate drive circuit along the first direction; and
the virtual unit groups and the decoding units have a one-to-one correspondence; and the decoding unit is on a side of a corresponding virtual unit group along the first direction.

8. The display panel according to claim 7, wherein:
the decoding unit is on a side of the first gate drive circuit which is electrically connected to the decoding unit away from the drive chip.

9. The display panel according to claim 7, wherein:
the fingerprint recognition units arranged along the first direction in all fingerprint recognition groups have a same quantity of rows.

10. The display panel according to claim 7, wherein:
the virtual units arranged along the first direction in all virtual unit groups have a same quantity of rows.

11. The display panel according to claim 3, wherein:
the non-display region further includes Q second gate drive circuits arranged along the second direction, wherein:
  a second gate drive circuit is electrically connected to at least two rows of the fingerprint recognition units extending along the first direction; and
  the drive chip includes a second encoding circuit including M signal output terminals; and
the non-display region further includes a second decoding circuit and M second signal lines, wherein:
  the second decoding circuit includes M signal input terminals and N signal output terminals;
  the signal output terminals of the second encoding circuit and the signal input terminals of the second decoding circuit have a one-to-one correspondence; and a signal output terminal of the second encoding circuit is electrically connected to a corresponding signal input terminal of the second decoding circuit through one second signal line;
  each second gate drive circuit is connected to one signal output terminal of the second decoding circuit correspondingly; and
  the second encoding circuit is same as the first encoding circuit, and the second decoding circuit is same as the first decoding circuit.

12. The display panel according to claim 11, wherein:
the first gate drive circuit and the second gate drive circuit are respectively on two sides of the display region along the first direction.

13. The display panel according to claim 12, wherein:
the first gate drive circuits and the second gate drive circuits have a one-to-one correspondence; and
the first gate drive circuit and the second gate drive circuit corresponding to the first gate drive circuit are electrically connected to a same fingerprint recognition unit.

14. The display panel according to claim 13, further including:
a plurality of first control signal lines extending along the first direction and a plurality of second control signal lines extending along the first direction, wherein:
  the fingerprint recognition units arranged along the first direction are electrically connected to a same first control signal line and a same second control signal line.

15. The display panel according to claim 14, wherein:
a fingerprint recognition unit includes a first transistor, a second transistor, a third transistor, a first capacitor, and a photodiode;
a gate electrode of the first transistor is electrically connected to the first control signal line, a first electrode of the first transistor is electrically connected to a first electrode of the photodiode, and a second electrode of the first transistor is connected to a third voltage signal terminal;
a gate electrode of the second transistor is electrically connected to the first electrode of the photodiode, a first electrode of the second transistor is electrically connected to a first electrode of the third transistor, and a second electrode of the second transistor is connected to the third voltage signal terminal;
a gate electrode of the third transistor is electrically connected to the second control signal line, and a second electrode of the third transistor is connected to a fingerprint signal output terminal;
a second electrode of the photodiode is electrically connected to a reference voltage terminal; and
a first terminal of the first capacitor is electrically connected to the first electrode of the photodiode, and a second terminal of the first capacitor is electrically connected to the second electrode of the photodiode.

16. A display device, comprising:
a display panel, comprising:
a display region and a non-display region surrounding the display region, wherein:
  the display region includes a plurality of fingerprint recognition units arranged in an array along a first direction and a second direction, wherein the first direction intersects the second direction;
  the non-display region includes a drive chip and Q first gate drive circuits arranged along the second direction, wherein:
    the drive chip is on a side of the display region and arranged along the second direction with the display region;
    a first gate drive circuit is electrically connected to at least two rows of fingerprint recognition units extending along the first direction; and
    the drive chip includes a first encoding circuit including M signal output terminals; and
  the non-display region further includes a first decoding circuit and M first signal lines, wherein the first decoding circuit includes M signal input terminals and N signal output terminals, wherein $1 \leq M < Q \leq N$, and M, Q, N are all positive integers;
  the signal output terminals of the first encoding circuit and the signal input terminals of the first decoding circuit have a one-to-one correspondence; and a signal output terminal of the first encoding circuit is electrically connected to a corresponding signal input terminal of the first decoding circuit through one first signal line; and
  each first gate drive circuit is connected to one signal output terminal of the first decoding circuit correspondingly.

17. The display device according to claim 16, wherein:
the first decoding circuit includes N decoding units; a decoding unit includes M signal input terminals and one signal output terminal; the signal input terminals of the decoding unit and the first signal lines have a one-to-one correspondence; a signal input terminal of the decoding unit is electrically connected to a corresponding first signal line; and each first gate drive circuit is connected to one signal output terminal of the decoding unit correspondingly.

18. The display device according to claim 17, wherein:
the decoding unit includes M first switch modules, one second switch module, and M inverters;
a first terminal of the second switch module is electrically connected to a first voltage signal terminal, and a second terminal of the second switch module is electrically connected to the signal output terminal of the decoding unit;

the first switch modules and the first signal lines have a one-to-one correspondence; a control terminal of a first switch module is electrically connected to a corresponding first signal line; a first terminal of each first switch module is electrically connected to a second voltage signal terminal; and a second terminal of each first switch module is electrically connected to the signal output terminal of the decoding unit; and the control terminal of the first switch module is electrically connected to the corresponding first signal line through one inverter, or electrically connected to the corresponding first signal line directly.

19. The display device according to claim 18, wherein:

the first switch module includes a first switch, and the second switch module includes a second switch;

a gate electrode and a first electrode of the second switch are both electrically connected to the first voltage signal terminal, and a second electrode of the second switch is electrically connected to the signal output terminal of the decoding unit;

the first switches and the first signal lines have a one-to-one correspondence; a gate electrode of the first switch is electrically connected to a corresponding first signal line, a first electrode of each first switch is electrically connected to the second voltage signal terminal, and a second electrode of each first switch is electrically connected to the signal output terminal of the decoding unit; and the gate electrode of the first switch is electrically connected to the corresponding first signal line through an inverter, or electrically connected to the corresponding first signal line directly.

20. The display device according to claim 18, wherein:

the first switch module includes a first switch, and the second switch module includes a first resistor;

a first electrode of the first resistor is electrically connected to the first voltage signal terminal, and a second electrode of the first resistor is electrically connected to the signal output terminal of the decoding unit;

the first switches and the first signal lines have a one-to-one correspondence; a gate electrode of the first switch is electrically connected to a corresponding first signal line, a first electrode of each first switch is electrically connected to the second voltage signal terminal, and a second electrode of each first switch is electrically connected to the signal output terminal of the decoding unit; and the gate electrode of the first switch is electrically connected to the corresponding first signal line through an inverter, or electrically connected to the corresponding first signal line directly.

* * * * *